United States Patent [19]

Barber

[11] Patent Number: 4,465,903
[45] Date of Patent: Aug. 14, 1984

[54] ELECTRONIC TELEPHONE INTERFACE CIRCUIT

[75] Inventor: Andrew C. Barber, Santa Monica, Calif.

[73] Assignee: Ixo, Inc., Culver City, Calif.

[21] Appl. No.: 487,223

[22] Filed: Apr. 21, 1983

[51] Int. Cl.³ ............................................... H04M 11/00
[52] U.S. Cl. .................................... 179/2 C; 179/81 B
[58] Field of Search ................ 179/2 C, 2 DP, 2 BC, 179/2 A, 2 AM, 16 AA, 18 FA, 81 R, 81 B, 170 NC

[56] References Cited

U.S. PATENT DOCUMENTS

| | | | |
|---|---|---|---|
| 4,203,009 | 5/1980 | Tattersall | 179/16 AA |
| 4,214,130 | 7/1980 | Questad | 179/81 R |
| 4,366,347 | 12/1982 | Takatsuki et al. | 179/20 P |

Primary Examiner—A. D. Pellinen
Assistant Examiner—W. J. Brady
Attorney, Agent, or Firm—Spensley, Horn, Jubas & Lubitz

[57] ABSTRACT

An electronic telephone interface circuit having a simplified, inductorless electronic gyrator circuit which also functions as an amplifying impedance convertor, and further having passive current and voltage limiting protection devices and an extremely fast active current limiting circuit. The system is particularly suitable for coupling a high impedance electronic system to a telephone communications system, and is adapted to permit the interface circuit and the electronic system to be powered solely from the telephone system.

7 Claims, 3 Drawing Figures

ELECTRONIC TELEPHONE INTERFACE CIRCUIT

ELECTRONIC TELEPHONE INTERFACE CIRCUIT

ELECTRONIC TELEPHONE INTERFACE CIRCUIT

BACKGROUND OF THE INVENTION

This invention relates to an electronic interface circuit, and more particularly to a fully electronic interface circuit for coupling an electronic system to a telephone communications system.

With the advent of remote data processing and telecommunications sytems and equipment, it has become desirable to couple electronic equipment and devices to a telephone communications system. In present day telephone communications systems, connection to the telephone system requires an interface circuit or device that couples an electronic system to a pair of conductors from the telephone system. In the past, the device used to connect an electronic system to the conductors of a telephone communications system has often been a coupling transformer (or other inductive device) used to match the electrical characteristics of the telephone system. However, inductive devices have certain disadvantages. For example, they may not provide the correct impedance matching over the entire voice band. In addition, signal coupling transformers used in communications systems are generally larger and more expensive than desirable, particularly where the electronic system to be coupled to the telephone line is designed to be handheld.

The prior art has sought to develop electronic coupling circuitry to replace such inductive devices. For example, U.S. Pat. No. 4,214,130 to Questad shows an electronic gyrator circuit for use in coupling an electronic system to a pair of communications lines. However, the invention shown in Questad permits signal coupling in one direction only, from the electronic system to the telephone system. Other prior art gyrators have contained numerous parts or have circuits using relatively expensive parts, either because great precision is needed in the values of the components, or because high power handling capabilities are necessary.

In coupling an electronic system to a telephone system, care must be taken to protect the electronic system from transient voltage and current surges. Such surges may be induced by lightning strikes on the telephone system lines. Further, the voltage and current characteristics of telephone systems vary widely. In the United States, for example, the loop current of a telephone system may range from approximately 20 milliamps to 90 milliamps. The voltage may range from approximately 42 volts to 60 volts, and the AC line impedance may range from 400 to 1300 ohms. Indeed, it is not unknown for any of these values to vary even beyond these ranges. Further, the DC polarity of the telephone line may be reversed from its nominal polarity. It is important to devise an interface system that will be compatible with and protect against these variations in the telephone system circuit characteristics, since the electronic system may be vary sensitive to changes in these parameters.

It is also often desirable to use the power available from a telephone system to power an electronic system. Because of the relatively small current available from a telephone system, an electronic system designed to be telephone-line powered must be carefully designed for low power consumption. With modern electronics, this goal is not difficult if the electronic system is not required to directly drive the telephone line. The telephone system typically has an impedance of 600 ohms. A typical low power electronic system may have a relatively high impedance, such as 20,000 ohms. Thus an impedance converter circuit is needed to match the impedance of the electronic system with the impedance of the telephone system. In the past, such impedance conversion typically has been performed through the use of relatively bulky and expensive transformers.

In many cases, it is also desirable to couple an electronic system to a telephone system using a fully controllable interface. Thus, it would be convenient and desirable to replace the mechanical hookswitch of a typical telephone system coupling circuit with a fully electronic hookswitch controllable by a remote manual switch or by electronic programmed control.

Therefore, it is an object of this invention to provide a new and improved electronic telephone interface circuit. More precisely, the functions that such an invention should achieve are as follows:

To provide a fully electronic, inductorless, bi-directional circuit suitable for coupling communications and voice signals from an electronic system to a pair of conductors of a telephone communications system.

To provide for an impedance conversion between a telephone system and an electronic system.

To eliminate bulky and expensive inductors.

To provide a small and inexpensive coupling means for bi-directionally coupling an electronic system to the conductors of a communications system.

To protect an electronic system from the telephone system in order to minimize or eliminate any damage to the electronic system from voltage or current surges.

To protect the electronic system from variations in the nominal electrical characteristics of the telephone system.

To replace the mechanical hookswitch in the coupling circuit between an electronic system and a telephone system with a remotely controllable electronic switch.

To provide an interface in compliance with FCC Part 68 (concerning standards for interfacing to the public telephone system) that will also withstand without damage line surges as outlined in Part 68.

The present invention achieves all of the above functions with a simple and inexpensive electronic circuit, described in full below.

SUMMARY OF THE INVENTION

The present invention provides an all electronic telephone interface circuit with several built-in circuit protection means, an electronic hookswitch, and a bi-directional, inductorless gyrator/impedence converter.

A field-effect transistor (FET) is used as an electronic hookswitch. Passive voltage surge protection and current surge protection devices are employed in conjunction with the FET hookswitch to protect the interface circuitry and the electronic system. The circuit protection means also includes a diode bridge rectifier, which makes the interface circuit independent of the electrical polarity of the telephone system.

As an additional protection means, the FET hookswitch, in conjunction with a current detection circuit, comprises an active series-connected protection circuit permitting the FET to operate in a linear-mode as a current limiting device.

Additional passive voltage surge protection devices are used in the interface circuit to provide further circuit protection.

A Darlington-connected transistor pair circuit functions as an all-electronic gyrator and impedance converter that creates a low-impedance DC signal path for the loop current of the telephone system, and bi-directionally couples signals from the low impedance telephone system to a high impedance electronic system.

The invention also permits current to be drawn from the telephone system for use in the electronic system.

Since no transformer is required in the electronic telephone interface circuit, and since the invention is formed of relatively small and inexpensive electronic components, the overall size and expense of the interface circuit of the present invention is substantially less than the size and expense of conventional coupling circuitry.

BRIEF DESCRIPTION OF THE DRAWINGS

The invention will become better understood by reference to the following detailed description when taken in conjunction with the accompanying drawings showing the preferred embodiment of the invention.

Like numbers and designations in the drawings refer to like elements.

DESCRIPTION OF THE PREFERRED EMBODIMENT

Figure 1:
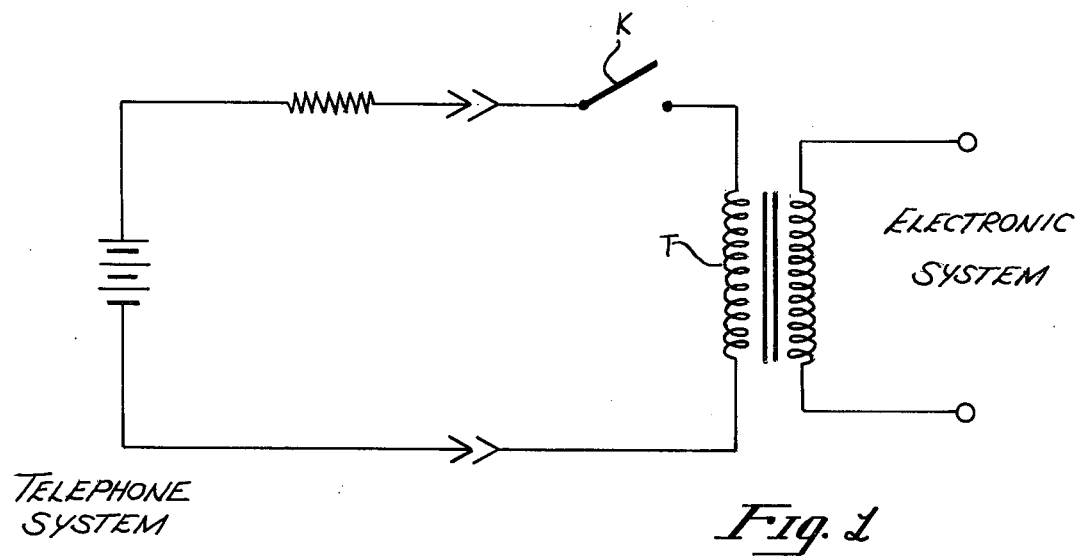
FIG. 1 is a schematic diagram of a prior art transformer-type signal coupler for coupling signals to the lines of a telephone communications system.

FIG. 1 shows a prior art transformer-type circuit for coupling signals to the lines of a telephone communications system (known in the art as the "tip" and "ring" lines). A mechanical hookswitch K couples an electronic system to the tip and ring lines of a telephone system through a coupling transformer T.

The disadvantage of this prior art system is that the transformer T is larger and more expensive than is desirable for small electronic systems. In addition, the transformer T may not provide the correct impedance matching over the entire voice band.

The present invention overcomes these problems by providing a less expensive system for coupling signals to the tip and ring lines. Moreover, the present invention imposes a negligible impedance error on the telephone system, and in fact approximately matches the impedance of the interface circuit to the telephone system.

Figure 2:
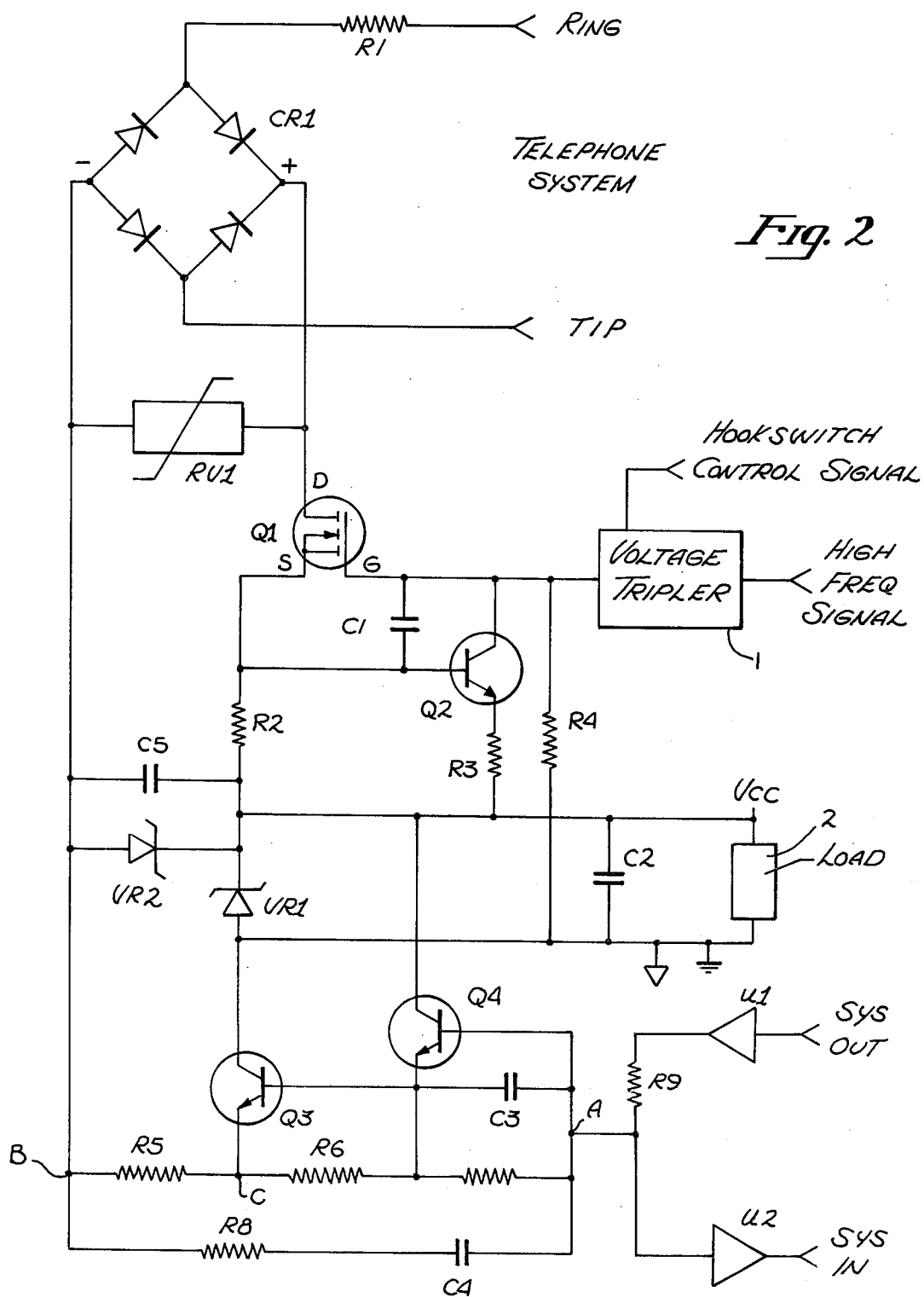
FIG. 2 is a partially block and partially schematic diagram of the present invention.

FIG. 2 shows the preferred embodiment of the electronic telephone interface circuit invention. The tip and ring lines of the telephone system are connected to the tip and ring lines of the interface circuit. The connection may be made, for example, through a modular phone jack of the type commonly in use.

In the interface circuit, resistor R1 limits current surges through the circuit, such as may occur from a lightning strike to the telephone lines. In the present embodiment, R1 limits the current to the interface circuit to about 10 amps.

The tip line is normally negative with respect to the ring line. However, in a particular telephone system, the polarity may be reversed. The diode bridge CR1 rectifies the polarity of the tip and ring signals, thereby obviating any polarity problems due to reversed tip and ring lines in the telephone system.

Device RV1 is a voltage surge limiting device for protection of the interface and electronic system circuitry. In the preferred embodiment, a metal oxide varistor is used, but a zener diode or any other voltage surge limiting device may be used. In the present embodiment, device RV1 limits the voltage across the output of rectifier CR1 to 400 volts maximum at a 10 amp surge current.

Field effect transistor (FET) Q1 is a relatively high power, high voltage, enhancement-mode device used as an electronic hookswitch. An enhancement-mode device is used in the preferred embodiment so that if the power supply to the FET fails, the gate voltage to FET Q1 will be terminated and the transistor will become non-conductive, thus guaranteeing an "on-hook" state for the interface circuit.

In the present embodiment, in order to permit the electronic system to operate completely off of the line power provided by the telephone system, a voltage tripler 1 is provided to generate a gate bias voltage to control the primary operation of FET Q1. The voltage tripler 1 circuitry may embody any one of various designs known in the prior art. One input to the voltage tripler 1 in the present design is a high frequency signal, typically having a frequency in the range of 20 kilohertz to one megahertz. Such frequencies may be easily generated by an electronic system in any one of several known fashions.

The output of the voltage tripler 1 is controlled by a Hookswitch Control Signal, which may be generated either through the use of programmed logic or from a remote manual switch. Activation of the Hookswitch Control Signal enables the voltage tripler 1 and causes it to supply a gate bias voltage to FET Q1. The output voltage from voltage tripler 1 also charges capacitor C1. Capacitor C1 filters any variations in the output of the voltage tripler and thereby prevents the conductive state of FET Q1 from oscillating.

Resistor R4 discharges capacitor C1 when the Hookswitch Control Signal deactivates the output of the voltage tripler 1. Deactivation of the voltage tripler 1 and discharge of capacitor C1 permits FET Q1 to become nonconductive, thus disconnecting the electronic system from the telephone system lines.

FET Q1, resistors R2 and R3, capacitor C1, and bipolar transistor Q2, comprise an innovative active current limiting circuit. The response time of this circuit is extremely fast, and may react to current surge conditions within six to ten nanoseconds. The purpose of this surge protection circuit is to limit the current through FET Q1 to less than approximately 200 milliamps, thus protecting the interface circuit as well as the electronic system coupled to the interface circuit.

Once the hookswitch FET Q1 is activated (thus permitting current to be conducted through it into the remainder of the interface circuit and the electronic system), the telephone system loop current passes through resistor R2, which has very low resistance. The voltage across resistor R2 is indicative of the value of the current through FET Q1. Transistor Q2 and resistor R3 are connected so as to detect the voltage across resistor R2. The collector of transistor Q2 is coupled to the base of FET Q1.

When the voltage across R2 exceeds the threshold voltage of transistor Q2, Q2 begins to conduct. As Q2 begins to conduct, capacitor C1 begins to discharge to ground through transistor Q2 and resistor R3. Resistor R3 prevents capacitor C1 from being virtually instantaneously discharged. The bias voltage on the gate of FET Q1 thus is reduced, which causes FET Q1 to come out of saturation and operate in its linear range. The lessened gate voltage on FET Q1 reduces its conductivity, thereby limiting the current through Q1. As the voltage across resistor R2 decreases, transistor Q2 tends to become non-conductive, thus allowing capacitor C1 to recharge and force FET Q1 towards saturation.

Capacitor C1 performs several functions. As noted previously, capacitor C1 filters any variations in the output of the voltage tripler 1. In addition, capacitor C1 prevents the feedback loop comprising FET Q1 and transistor Q2 from oscillating.

Resistor R3, in addition to preventing too rapid discharge of capacitor C1, also acts as a protective circuit limiting the current through the base-emitter junction of transistor Q2.

The output of resistor R2 constitutes the direct current system output node, $V_{DC}$, for the electronic system. In the present embodiment, $V_{DC}$ is nominally 5 volts. A capacitor from $V_{DC}$ to ground, such as capacitor C2, may be provided to filter the $V_{DC}$ power supply output. It should be noted that the electronic system of the present invention uses a common floating AC and DC system ground rather than an earth ground.

A load 2 (for example, an electronic circuit) may be coupled across the $V_{DC}$ output and the system ground. The load should be designed to draw less than approximately 20 milliamps of current, since some telephone systems to which the interface circuit may be coupled cannot provide greater than that amount of current.

When the Hookswitch Control Signal is activated, thereby making FET Q1 conductive, the DC current path from the ring and tip input lines is from the plus terminal of rectifier bridge CR1, through FET Q1 and resistor R2, and then through the load 2 to system ground. The voltage output at $V_{DC}$ has to be regulated to the desired value. Because the output voltage and DC output impedance of a telephone system are not constant, it is also necessary to regulate the loop current from the telephone system to the electronic system. Because it is desirable to match the input impedance of the electronic system load to the impedance of the telephone system, a series regulator is not desirable. Therefore, zener diode VR1 is provided to regulate $V_{DC}$ to approximately five volts, and to shunt current around the load 2 if the telephone system loop current is in excess of the load current. For diode VR1 to operate properly in regulating the current to the electronic system, the load 2 must be designed to draw current less than that of the minimum loop current of a telephone system (typically 20 milliamps). Because excess voltage to the load 2 would be detrimental to the electronic system, diode VR1 serves as a further protection device in the present invention.

To understand fully the remainder of the interface circuit, some additional information concerning telephone systems should be noted. Any electronic system coupled to the telephone system should have an impedance of less than approximately 200 ohms for signals from about 50 hertz to DC. However, in order to match the AC impedance of a telephone phone system, the impedance of the electronic system should be approximately 600 ohms for audio frequencies greater than about 250 hertz.

In the prior art, high value inductive coupling transformers have been used to provide a low impedance DC path while creating a (relatively) high impedance AC path. However, such transformers have been necessarily physically large because DC current may saturate smaller iron core inductors, thus preventing inductive AC coupling. An accepted solution in the past has been to use a large inductive "holding" coil to provide a low impedance DC signal path, and thus prevent saturation of a small AC coupling transformer.

In the present invention, a novel electronic gyrator circuit has been devised that provides a low impedance DC path while providing an AC path that matches the impedance of the telephone system. In addition, this novel gyrator circuit performs a second function of bi-directional impedance conversion, so that the electronic system may have an actual impedance thirty or more times the AC impedance of the telephone system. This latter characteristic is highly desirable in that it allows the use of, for example, 20,000-ohm line driver circuits rather than 600-ohm line driver circuits. High impedance line driver circuits are simpler to fabricate than 600 ohm circuits, and require less power for their operation, thereby permitting greater power to be made available to the other circuitry of the electronic system.

In the gyrator/impedance converter circuit, transistor Q3 and resistor R5 complete the DC circuit path through the interface circuit from the tip line to the ring line of the telephone system. Transistors Q3 and Q4 are connected as a Darlington pair, and provide a low impedance DC signal path.

Elements U1 and U2 are shown for reference purposes only. Typically, U1 and U2 would be amplifiers, but modem filter elements could be used instead. Audio signals are bi-directionally coupled between the interface circuit and the electronic circuit through U1 and U2. U1 and U2 are part of a two-wire to four-wire hybrid circuit in the electronic system. Such a circuit is well known to persons skilled in the art, and is not shown for purposes of simplicity.

Signals from the electronic system output at U1 modulate the current through resistor R9 and thus modulate the interface circuit loop current. Element U1 is biased so that output signals from the electronic system through U1 have approximately a two-volt bias in the preferred embodiment. The signal path through resistor R9 to transistor Q4 thus serves both as the bias path and the signal path for that transistor.

The gyrator circuit works in principal as follows: when the interface circuit is in the "on hook" state, capacitor C4 is discharged. When FET Q1 is made conductive, such that the interface circuit is in the "off hook" state, capacitor C4 begins to charge. As capacitor C4 begins to charge, the accumulated voltage on that capacitor will cause transistor Q4 to begin to conduct, thereby causing transistor Q3 to begin to pull current through its collector. As capacitor C4 continues to charge, transistor Q4, and hence transistor Q3, conducts more current. Capacitor C4 and the Darlington-connected transistors, Q3 and Q4, quickly reach a point of equilibrium where the voltage on capacitor C4 is enough to keep transistor Q3 conducting at a value equal to the loop current of the telephone system.

If node A shown in FIG. 2 is then modulated at a frequency greater than approximately 250 hertz, the voltage across capacitor C4 does not change to any great degree, and hence the collector current of transistor Q3 does not vary much. Thus, the gyrator circuit of the present invention emulates a good inductor (having approximately ten henry's of inductance in the preferred embodiment), providing a low impedance DC path for the loop current from the telephone system.

Capacitor C3 prevents oscillation of the gyrator circuit from any feedback response. Resistor R6 causes a more constant current to be drawn through transistor Q4 and improves the linearity of the gyrator circuit. Resistor R7 provides a more constant current flow through resistor R9, which biases transistor Q4.

Figure 3:
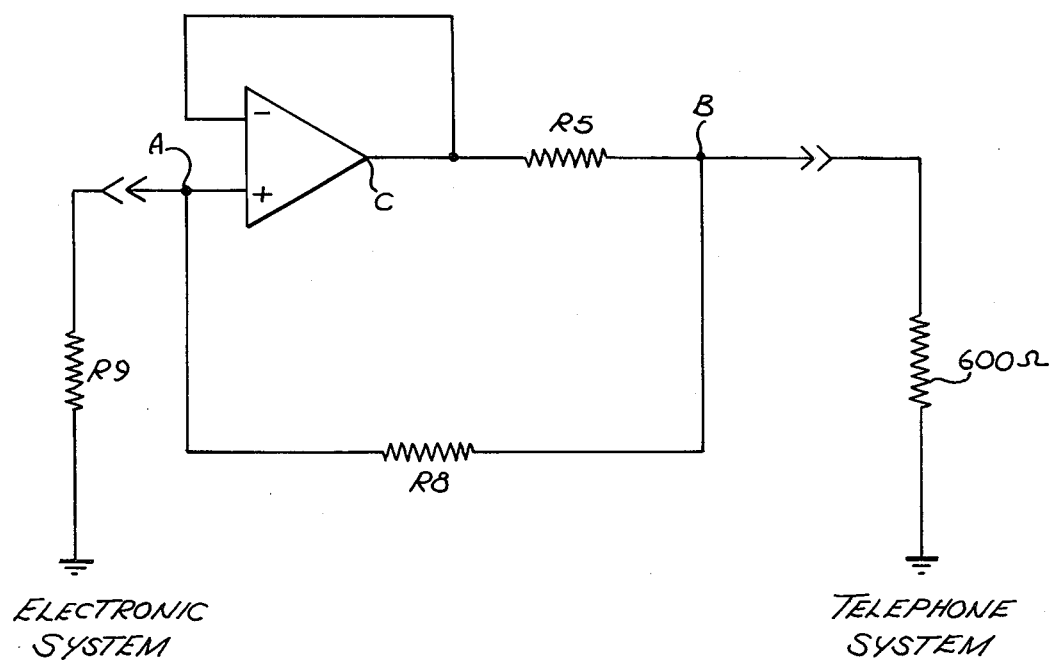
FIG. 3 is a schematic diagram of the AC equivalent circuit of the impedance converter of the present invention.

The addition of resistor R8 to the gyrator circuit is important, in that it permits the gyrator to perform an impedance and voltage transformation function as well as to emulate an inductive holding coil. A simplified AC equivalent circuit of the impedance converter circuit is shown in FIG. 3. In essence, the Darlington-connected transistors form an amplifier having a gain of one. For signals sent from the electronic system to the telephone system, a one volt incremental signal generated at node A will cause the current into node A to be approximately 50 microamps. Applying Ohm's Law, the input impedance of the interface circuit at node A appears to be 20,000 ohms, thus matching the output impedance of the electronic system. In addition, a one volt (approximately) incremental output signal will appear at node B.

On the other hand, for signals sent from the telephone system to the electronic system, a one volt increment introduced at node B causes a current of approximately 1.6 milliamps to flow into node B. To the telephone system, the interface circuit appears to have an input impedance of 600 ohms, thus matching the AC output impedance of the telephone system. In addition, a one volt (approximately) incremental output signal will appear at node A.

This portion of the invention therefore performs not only the function of a gyrator circuit, providing a low impedance DC path for the telephone system loop current, but also performs a bi-directional impedance transformation from approximately 600 ohms to 20,000 ohms (in the present embodiment). In addition, this circuit performs a bi-directional voltage transformation of the signal such that a one volt incremental input from either the telephone system or the electronic system appears as an (approximately) one volt output signal increment in the other system.

In the remaining portion of the inventive circuit, capacitor C5 acts as a filter of high frequency noise (above approximately 7 to 8 kilohertz) present in signals received by the electronic system from the telephone lines, and from signals sent from the electronic system to the telephone system.

Zener diode VR2, which is coupled between the plus and minus rails of the telephone system input lines, is a voltage limiting device that prevents the magnitude of the voltage from $V_{DC}$ and system ground from exceeding about 10 volts. Zener diode VR2 thus protects transistors Q3 and Q4 from excessive voltage transients. Zener diode VR2 also serves as a backup protection device to zener diode VR1. If zener diode VR1 fails, zener diode VR2 will prevent the voltage to the electronic system from exceeding approximately 10 volts.

In summary, the invention teaches an electronic telephone interface circuit with both active and passive voltage and current protection circuits, an active current limiting circuit, and an inductorless, bi-directional, all electronic gyrator and amplifying impedance converter.

Although various circuit values could be used for the active and passive elements of the present invention, one set of circuit parameters for the passive devices used in the present embodiment are set forth below:

| | |
|---|---|
| R1 47 ohms | C1 .0047 microfarads |
| R2 3.3 ohms | C2 .047 microfarads |
| R3 10 ohms | C3 100 picofarads |
| R4 100K ohms | C4 4.7 microfarads |
| R5 10 ohms | C5 .01 microfarads |
| R6 4.7K ohms | |
| R7 5.6K ohms | |
| R8 330 ohms | |
| R9 20K ohms | |

While a particular embodiment with particular circuit values are shown in the above description of this invention, it should be understood that changes can be made without departing from the spirit or scope of the invention. For example, the values of the various circuit elements may be varied in order to accommodate differences in a particular telephone system, or to accommodate the voltage and current requirements of a particular electronic system. Furthermore, the Darlington-connected transistors of the gyrator/impedance converter circuit of the present invention may be implemented with a single transistor using techniques well-known in the art. Thus, this invention is not to be limited to the specific embodiment discussed and illustrated herein, but rather by the following claims.

I claim:

1. An interface circuit for coupling an electronic system to a telephone line, comprising:
   (a) an inductorless electronic gyrator coupled in series with the telephone line, for providing a low impedance DC signal path through the interface circuit, and for providing a higher impedance signal path for AC signals from or to the telephone line; and
   (b) a signal coupler means, coupled to the higher impedance signal path of the gyrator and to the electronic system, for converting the impedance of the electronic system for AC signals from the telephone line to the electronic system, and for converting the impedance of the telephone line for AC signals from the electronic system to the telephone line, and for voltage conversion of AC signals from the telephone line to the electronic system and from the electronic system to the telephone line.

2. The interface circuit of claim 1, further comprising:
   (a) an active switch coupled in series between the telephone line and the gyrator, for opening or closing the electrical circuit path between the telephone line and the interface circuit.

3. A bidirectional, inductorless, electronic gyrator for coupling an electronic system to a telephone system, comprising:
   (a) a first bipolar transistor, having its collector coupled to a first lead of the telephone system;
   (b) a first resistor coupled to the emitter of the first transistor and to a second lead of the telephone system;
   (c) a second bipolar transistor having its collector coupled to the first lead of the telephone system and its emitter coupled to the base of the first transistor;

(d) a second resistor connecting the emitter of the second transistor to the emitter of the first transistor;

(e) a first capacitor connecting the base and emitter of the second transistor;

(f) a third resistor connecting the base and emitter of the second transistor;

(g) a second capacitor connecting the base of the second transistor and the second lead of the telephone system;

(h) a fourth resistor coupled to the base of the second transistor;

(i) a first interface circuit having a biased output voltage, the output of which is coupled to the fourth resistor, and the input of which is coupled to the electronic system; and (l) a second interface circuit, the input of which is coupled to the base of the second transistor, and the output of which is coupled to the electronic system;

wherein the first transistor and the first resistor provide a low impedance DC signal path through the gyrator, and the gyrator provides a bidirectional, high impedance AC signal path between the telephone system and the electronic system through the first and second interface circuits.

4. A bidirectional, inductorless, interface circuit for coupling an electronic system to a telephone line, comprising:

(a) a first protection circuit connected in series with the telephone line, for limiting current surges to the interface circuit and for providing a uniform polarity for signals received from the telephone line;

(b) an active switch and current limiting means, coupled in series with an output of the first protection circuit, and including a current surge detector and a variable resistance device, for detecting current surges from the telephone line and rapidly increasing the resistance of the variable resistance device in response thereto, and for opening or closing the electrical circuit path between the telephone line and the interface circuit;

(c) an inductorless electronic gyrator coupled in series with the active switch and current limiting means and an output of the first protection circuit, for providing a low impedance DC signal path through the interface circuit, and for providing a higher impedance signal path for AC signals from or to the telephone line; and (d) a signal coupler means, coupled to the higher impedance signal path of the gyrator and to the electronic system, for converting the impedance of the electronic system for AC signals from the telephone line to the electronic system, and for converting the impedance of the telephone line for AC signals from the electronic system to the telephone line, and for voltage conversion of AC signals from the telephone line to the electronic system and from the electronic system to the telephone line.

5. The inductorless bidirectional interface circuit of claim 4, further comprising:

(a) a second protection circuit coupled in parallel with the outputs of the first protection circuit means, for limiting voltage surges to the interface circuit;

(b) a signal filter, coupled in parallel with the gyrator, for eliminating high frequency noise from signals between the telephone line and the electronic system; and (c) a third protection circuit, coupled in parallel with the gyrator, for limiting voltage surges through the interface system.

6. The inductorless bidirectional interface circuit of claim 5, further comprising:

a voltage regulating means coupled in series between the active switch and current limiting means and the gyrator, and coupled in parallel with the electronic system, for providing a regulated voltage output from the telephone line when the active switch and current limiting means is in a closed circuit mode.

7. An inductorless bidirectional interface circuit for coupling an electronic system to a telephone system, comprising:

(a) a passive current limiting means connected in series with a first input from the telephone system, for limiting current surges to the interface circuit;

(b) a polarity rectification means, coupled in series with the passive current limiting means and a second input from the telephone system, for providing a uniform polarity for signals received from the telephone system;

(c) a first voltage limiting means coupled in parallel with the outputs of the polarity rectification means, for limiting voltage surges to the interface circuit;

(d) an active switch and current limiting means, coupled in series with an output of the polarity rectification means, and including a current surge detector and a variable resistance device, for detecting current surges from the telephone system and rapidly increasing the resistance of the variable resistance device in response thereto, and for opening or closing the electrical circuit path between the telephone system and the interface circuit;

(e) a voltage regulating means coupled in series with the active current limiting means and in parallel with the electronic system, for providing a regulated voltage output from the telephone system when the active switch and current limiting means is in a closed circuit mode;

(f) an inductorless electronic gyrator coupled in series with the voltage regulating means and the polarity rectification means, for providing a low impedance DC signal path through the interface circuit, and for providing a higher impedance signal path for AC signals from or to the telephone line;

(g) a signal coupler means, coupled to the higher impedance signal path of the gyrator and to the electronic system, for converting the impedance of the electronic system for AC signals from the telephone line to the electronic system, and for converting the impedance of the telephone line for AC signals from the electronic system to the telephone line, and for voltage conversion of AC signals from the telephone line to the electronic system and from the electronic system to the telephone line;

(h) a signal filter means, coupled in parallel with the voltage regulating means and the gyrator, for eliminating high frequency noise from signals between the telephone system and the electronic system; and (i) a second voltage limiting means, coupled in parallel with the voltage regulating means and the gyrator, for limiting voltage surges in the interface system.

* * * * *